United States Patent [19]

Nakatani

[11] Patent Number: 4,959,737
[45] Date of Patent: Sep. 25, 1990

[54] IMAGE SCANNING APPARATUS FOR USE IN AN IMAGE READER, A COPYING MACHINE AND THE LIKE

[75] Inventor: Munehiro Nakatani, Osaka, Japan

[73] Assignee: Minolta Camera Kabushiki Kaisha, Osaka, Japan

[21] Appl. No.: 204,678

[22] Filed: Jun. 9, 1988

[30] Foreign Application Priority Data

Dec. 6, 1987 [JP] Japan .................................. 62-147477

[51] Int. Cl.⁵ .............................................. H04N 1/04
[52] U.S. Cl. .................................... 358/475; 358/474; 355/69
[58] Field of Search ............... 358/256, 285, 292, 293, 358/294, 471, 473, 475, 474, 480, 493, 494, 497; 355/8, 69, 228, 229, 69; 315/115

[56] References Cited

U.S. PATENT DOCUMENTS

| | | | |
|---|---|---|---|
| 4,073,584 | 2/1978 | Kitajima | 355/8 |
| 4,623,937 | 11/1986 | Watanabe | 358/285 |
| 4,649,437 | 3/1987 | Watanabe | 358/285 |
| 4,651,222 | 3/1987 | Gokita | 358/293 |
| 4,689,693 | 8/1987 | Watanabe | 358/285 |
| 4,731,668 | 3/1988 | Satomura et al. | 358/293 |
| 4,733,266 | 3/1988 | Watanabe | 355/8 |
| 4,760,609 | 7/1988 | Tamagaki | 355/69 |
| 4,779,121 | 10/1988 | Okumura | 355/69 |
| 4,798,997 | 1/1989 | Egami et al. | 355/69 |
| 4,816,922 | 3/1989 | Futaki | 358/280 |
| 4,853,739 | 8/1989 | Miyamoto et al. | 355/229 |

FOREIGN PATENT DOCUMENTS

| | | |
|---|---|---|
| 56-95270 | 8/1981 | Japan . |
| 57-34509 | 7/1982 | Japan . |
| 59-66240 | 5/1984 | Japan . |
| 62-2323 | 1/1987 | Japan . |

Primary Examiner—James J. Groody
Assistant Examiner—Kim Yen Vu
Attorney, Agent, or Firm—Price, Gess & Ubell

[57] ABSTRACT

The present invention relates to an image scanning apparatus for scanning the image of a document by moving a light source along the document image. In the image scanning apparatus of the present invention, the light source and the drive circuit for generating a high voltage to turn on the light source are mounted on a slider movable along the document image.

17 Claims, 3 Drawing Sheets

4,959,737

IMAGE SCANNING APPARATUS FOR USE IN AN IMAGE READER, A COPYING MACHINE AND THE LIKE

BACKGROUND OF THE INVENTION

1. Field of the Invention

The present invention relates to an image scanning apparatus for use in image readers, copying machines and the like, and more particularly to an image scanning apparatus for scanning the image of a document by moving a light source along the document image.

2. Description of the Prior Art

For use in image readers and the like, various image scanning apparatus have heretofore been proposed in which the image of a document is scanned and exposed by the movement of a light source along the document.

FIG. 1 is a block diagram conceptionally showing the construction of a conventional image scanning apparatus of the type stated above. The apparatus comprises a light source 170 for illuminating the document surface, movable means (slider) 101 supporting the light source 170 thereon and movable along the document surface, drive means 140 for supplying high-voltage current to the light source 170 to light the light source 170, control means (not shown) for controlling the drive means 140, and means for supplying electric power. The drive means 140 is fixedly mounted on the body of the apparatus and connected to the light source 170 through a harness which includes a bundle of cables such as signal wires, electric power supply line and the like.

A heater 183 is provided around the light source 170 when required for improving the light-intensity rise characteristics of the light source.

With the conventional apparatus, the light source 170, the heater 183, etc. are mounted, in the form of a unit, on the movable means 101, while the drive means 140 is mounted on the body of the apparatus and connected to the light source 170 by the harness through which high-voltage current flows as described above.

Accordingly, full care must be taken in handling the harness connecting the movable means (light source and heater) 101 to the fixed body (drive means).

For example, since the high-voltage current for driving the light source 170 flows through the harness, the components or members around the harness need to have sufficient insulating properties.

The harness, which is connected at its one end to the movable means 101, is continually deformed with the travel of the movable means and is therefore required to have high flexibility and also sufficient strength against a break due to the deformation.

The harness includes the high-voltage line (power line) for driving the light source in combination with the control signal wires and consequently has the problem that the control signal is liable to pick up noises.

Nevertheless, it is economically disadvantageous to use materials of sufficient insulating propertes around the harness.

Additionally, with a tendency to use a plurality of light sources and to resort to a more complex mode of control, there is a tendency to incorporate an increased number of wires or cables into the harness. It is therefore difficult to give high flexibility to the harness.

SUMMARY OF THE INVENTION

The main object of the present invention is to provide an improved image scanning apparatus.

Another object of the invention is to provide an image scanning apparatus wherein the control signals delivered from control means are free from noises.

Still another object of the invention is to provide an image scanning apparatus wherein a cable having full flexibility is used for transmitting control signals to movable means carrying a light source.

These and other objects of the present invention can be fulfilled by an image scanning apparatus comprising:

a platen for placing a document thereon, means movable along the platen, a light source mounted on the movable means for illuminating the surface of the document, drive means provided on the movable means for applying a high voltage to the light source to turn on the light source, control means provided on the body of the image scanning apparatus for controlling the operation of the drive means, power supply means provided on the body of the image scanning apparatus for supplying electric power to the drive means, signal wires interconnecting the control means and the drive means, and a power supply line interconnecting the power supply means and the drive means.

These and other objects, advantages and features of the invention will become apparent from the following description thereof taken in conjunction with the accompanying drawings which illustrate a specific embodiment of the invention.

BRIEF DESCRIPTION OF THE DRAWINGS

In the following description, like parts are designated by like reference numbers throughout the several drawings.

DETAILED DESCRIPTION OF THE INVENTION

An embodiment of the present invention will be described below with reference to the drawings.

Figure 1:
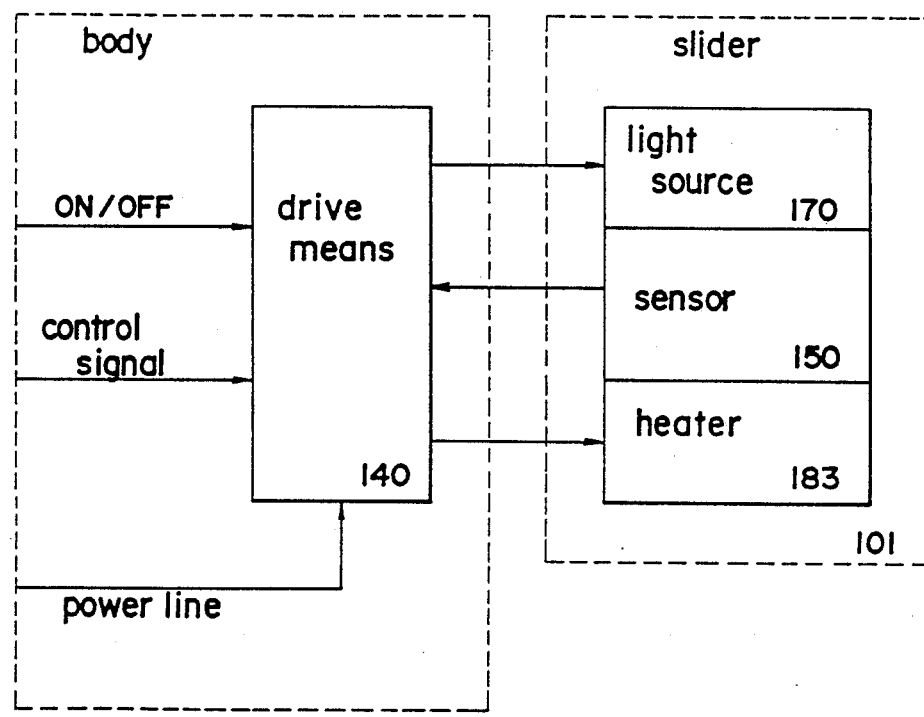
FIG. 1 is a diagram conceptionally illustrating a conventional image scanning apparatus.
Figure 2:
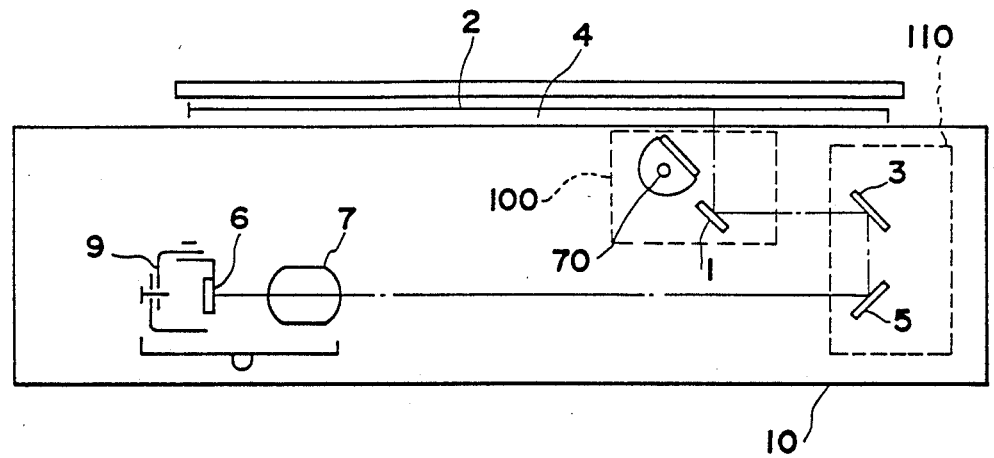
FIG. 2 is a sectional view schematically showing the construction of an image reader embodying the invention.

FIG. 2 is a view in section schematically showing the construction of an image reader to which the invention is applied.

The image reader has at its top a glass platen 4 for placing a document 2 thereon. Arranged below the glass platen 4 are a CCD line sensor 6 for reading an image of the document 2 on conversion to electric signals, and an optical system positioned above the sensor 6 for projecting the image of the document.

The optical system comprises a fluorescent lamp 70, reflecting mirrors 1, 3, 5 and a projection lens 7. The fluorescent lamp 70 and the reflecting mirror 1 are mounted on a first slider 100, and the assembly moves at a velocity V in the direction of arrow a shown. The reflecting mirrors 3, 5 are mounted on a second slider 110, which moves at one-half the velocity of the first slider 100, i.e. at V/2, in the direction of arrow a. Thus, the document image is scanned for exposure by the fluorescent lamp 70 in the direction of arrow a, with the result that the light emitted by the lamp 70 and reflected from the document surface is projected onto the CCD line sensor 6 via the reflecting mirrors 1, 3, 5 and the projection lens 7.

The sensor 6 is movable by a focusing mechanism 9 in the direction of the optical axis for focus adjustment.

Figure 3:
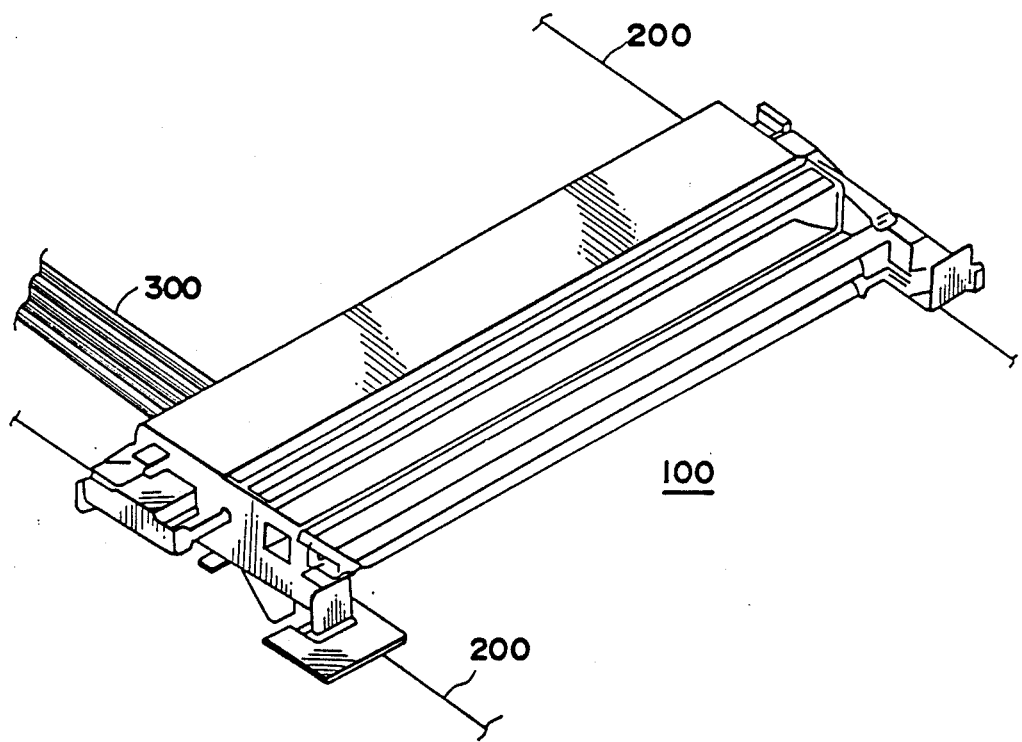
FIG. 3 is a perspective view showing a first slider 100 illustrated in FIG. 2.

FIG. 3 is a perspective view of the first slider 100, which is mounted on rails 200 and movable thereon. Indicated at 300 is a bundle of cables such as a power supply line and signal wires as will be described later. Through the bundle of cables, various control signals from control means 10a (such as a microcomputer) on the body of the image reader are transmitted, and power is supplied to the high-frequency drive circuit 40 to be described later. The bundle of cables will hereinafter be referred to as a "harness."

Figure 4:
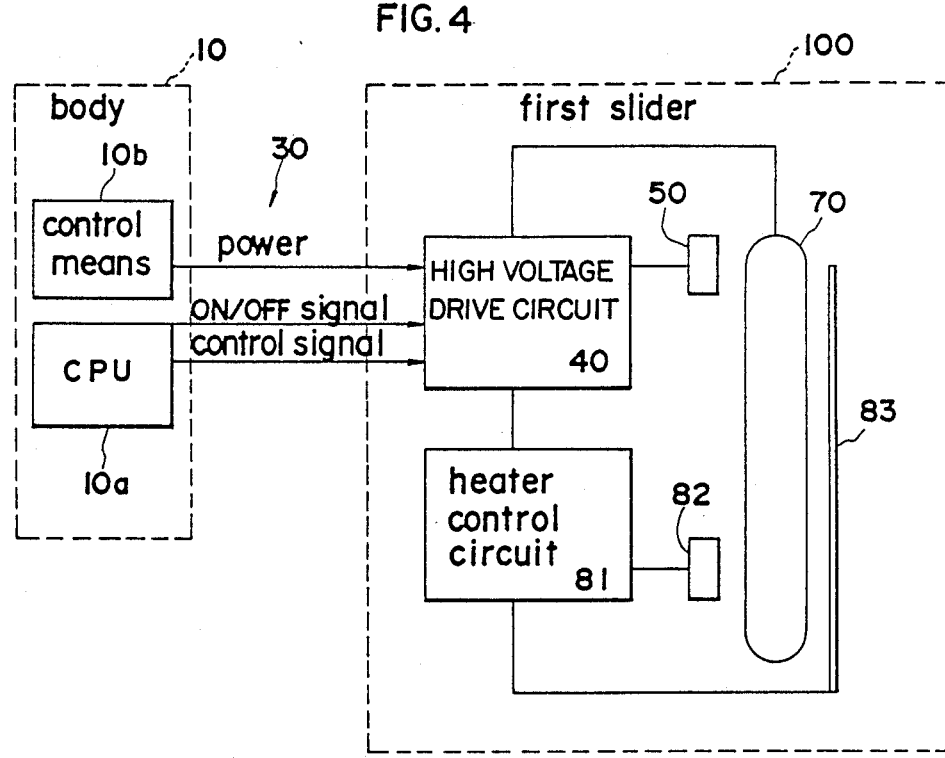
FIG. 4 is a block diagram showing the image reader of FIG. 2.
Figure 5:
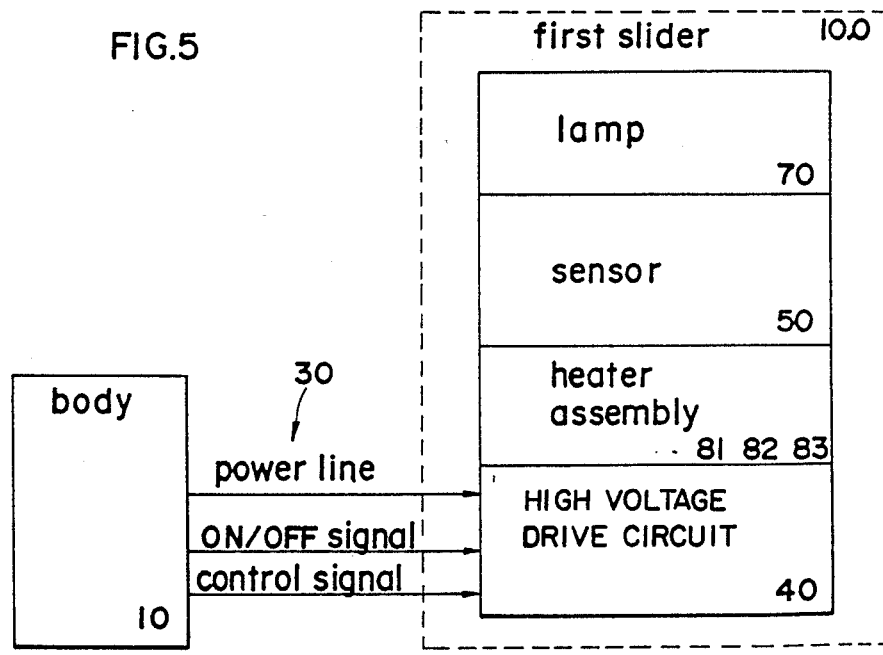
FIG. 5 is a diagram conceptionally illustrating the image reader of FIG. 2.

FIG. 4 is a block diagram of the image reader, and FIG. 5 is a diagram conceptionally showing the image reader. With reference to FIGS. 4 and 5, the first slider 100 has mounted thereon, in addition to the fluorescent lamp 70 and the reflecting mirror 1 described, the above-mentioned high-frequency drive circuit 40 for applying a high-frequency high voltage to the fluorescent lamp 70 to light the lamp, a heater 83 for heating the lamp 70, a sensor 50 for detecting the quantity of light from the lamp 70, a thermistor 82 for detecting the ambient temperature around the lamp 70, and a heater control circuit 81 for controlling the heater 83 in accordance with the temperature detected by thermistor 82.

The quantity of light emitted by the fluorescent lamp 70 is detected by the sensor 50, which feeds the resulting signal to the high-frequency drive circuit 40. Through the signal lines included in the flexible harness 300 (see FIG. 3), the microcomputer 10a mounted on the body 10 of the image reader feeds to the drive circuit 40 various control signals such as ON/OFF signals instructing the circuit 40 to turn on and turn off the fluorescent lamp 70 and a control signal for specifying the quantity of light to be emitted by the lamp when it is on. In response to these signals, the drive circuit 40 applies a high voltage to the lamp 70 so that the lamp is turned on to give the quantity of light specified by the light quantity control signal.

The heater control circuit 81 receives a temperature detection signal from the thermistor 82 and a signal from the drive circuit 40, supplying power to the heater 83 and controlling the heater so as to adjust the ambient temperature around the lamp 70 to a predetermined level.

Control means 10b on the apparatus body 10 supplies power to the drive circuit 40 through the power line (harness 300).

With the present embodiment, the drive means for the fluorescent lamp is mounted on a slider along with the lamp and is movable with the lamp as described above. Consequently, a harness through which high-voltage current flows need not be drawn along within the image reader. The harness used, unlike the conventional one, therefore does not require serious attention to the insulation of its surroundings, hence a cost reduction.

Furthermore, the harness, which comprises a power supply line and signal wires, is smaller in the number of cable components than the conventional one, can accordingly be given sufficient flexiblity and exerts no adverse influence on the movement of the first slider.

The absence of any high-voltage line in the vicinity of the control signal wires or lines effectively assures noise-free transmission of the control signals.

Although a high-frequency voltage is applied to the fluorescent lamp 70 according to the present embodiment in order to preclude the lamp 70 from flickering while it is on, the control signals can be also free from noises due to the high-frequency voltage.

The present invention has been described above as applied to an image scanning apparatus for use in image readers, whereas the invention can of course be embodied as image scanning apparatus for copying machines and the like.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image scanning apparatus comprising:
    a body member;
    a platen provided on the body member of the image scanning apparatus for placing a document thereon;
    a light source for illuminating the surface of the document;
    holding means for holding said light source thereon and movable along the platen within the body member of the image scanning apparatus for scanning the document;
    power control means provided in the body member of the image scanning apparatus;
    drive means for generating a high voltage which is applied to the light source to turn on the same and is provided on said holding means for integral movement therewith, the drive means being supplied with electrical power by the power control means, and
    a power supply line interconnecting the power control means and the drive means.

2. An image scanning apparatus as claimed in claim 1, further comprising control means provided on the body member of the image scanning apparatus for outputting control signals to control the operation of the drive means, and signal wires interconnecting the control means and the drive means.

3. An image scanning apparatus as claimed in claim 1 wherein, said light source is fluorescent lamp.

4. An image scanning apparatus as claimed in claim 3, further comprising heating means provided on the holding means for heating the fluorescent lamp.

5. An image scanning apparatus comprising:
    a body member;
    a platen provided on the body member of the image scanning apparatus for placing a document thereon;
    a light source for illuminating the surface of the document on the platen;

a photoelectric converting means for converting an image of the document to corresponding electrical signals;

means for projecting light which is emitted by the light source so that it is reflected from the document surface onto the photoelectric converting means;

holding means for holding said light source thereon, the holding means being movable along the platen relative to and within the body member of the image scanning apparatus, for scanning the document;

drive means for generating a high voltage which is applied to the light source to turn on the same, the drive means being provided on said holding means for integral movement therewith;

power control means provided in the body member of the image scanning apparatus, apart from the holding means and relatively stationary with the body member, for supplying electrical power to the drive means, and a power supply line interconnecting the power control means and the drive means.

6. An image scanning apparatus as claimed in claim 5 wherein said projecting means includes a plurality of mirrors and a projecting lens, and one of the mirrors is mounted on the holding means.

7. An image scanning apparatus as claimed in claim 5, further comprising control means provided on the body member of the image scanning apparatus for outputting control signals to control the operation of the drive means, and signal wires interconnecting the control means and the drive means.

8. An image scanning apparatus as claimed in claim 5 wherein, said light source is fluorescent lamp.

9. An image scanning apparatus as claimed in claim 8, further comprising heating means provided on the holding means for heating the fluorescent lamp.

10. An image scanning apparatus comprising:
a body member;
a platen provided on the body member of the image scanning apparatus for placing a document thereon;
a fluorescent lamp for illuminating the surface of the document on the platen;
holding means holding said fluorescent lamp thereon and movable along the platen within the body member of the image scanning apparatus for scanning the document;
drive means for applying a high-frequency high voltage to the fluorescent lamp to turn on the same and also provided on said holding means for integral movement therewith;
a power control means provided on the body member of the image scanning apparatus for supplying electrical power to the drive means;
a power supply line interconnecting the power control means and the drive means;
control means provided on the body member of the image scanning apparatus for outputting control signals to control the operation of the drive means; and
signal wires interconnecting the control means and the drive means.

11. An image scanning apparatus comprising:
a body member;
a platen provided on the body member of the image scanning apparatus for placing a document thereon;
means for illuminating the surface of the document;
stationary power control means provided on the body member of the image scanning apparatus;
means for transforming a voltage level applied by the power control means into a higher voltage, and for applying the higher voltage to the illuminating means;
holding means holding said illuminating means and said transforming means thereon and movable along the platen for scanning the document, and
a power supply line interconnecting the stationary power control means and the movable transforming means for applying the voltage to the transforming means.

12. In an improved image scanning apparatus comprising:
a housing member connected to a power supply;
means connected to the housing member for supporting a document;
illumination means for illuminating the surface of the document;
a member movably mounted relative to the support means for moving the illumination means within the housing member, the illumination means being mounted on the member for reciprocal movement;
means for generating a higher voltage than the voltage level of the power supply for application to the illumination means, the generating means being mounted on the member;
means for controlling the generating means with control signals, and
a set of wires connected to the generating means consisting of control signal wires from the controlling means and a power wire connected to the power supply of the housing member, the wires moving with the movable member at one end of the wires and relatively stationary at their other end.

13. The image scanning apparatus of claim 12 further comprising heating means for heating the illumination means.

14. The image scanning apparatus of claim 13 further comprising a heat sensor to monitor the temperature of the illumination means.

15. An image scanning apparatus comprising:
a housing member;
a platen provided on the housing member;
a lamp means for illuminating a document placed on the platen;
a drive means for generating a high-frequency voltage which is applied to the lamp means, and
means for moving the drive means and the lamp means integrally within the housing member along the platen.

16. An image scanning apparatus as claimed in claim 15, further comprising a power supplying means provided stationary with the housing member for supplying electrical power to the drive means, a power supply line interconnecting the power supplying means and the drive means, an illumination control means provided stationary with the housing member for controlling the drive means, and a control line interconnecting the illumination control means and the drive means, said illumination control means sending ON/OFF signals instructing the drive means to turn on and turn off the illumination by the lamp means, and control signals for specifying the quantity of light to be emitted by the lamp means through the control line.

17. An image scanning apparatus as claimed in claim 16, wherein said lamp means is a fluorescent lamp, and the image scanning apparatus further comprises a heating means for heating the fluorescent lamp, a thermistor for detecting an ambient temperature around the fluorescent lamp, and a heat control means for controlling the heater in accordance with the temperature detected by the thermistor, and said moving means integrally moves the heating means, the thermistor, the heater control means, the fluorescent lamp, and the drive means.

* * * * *